(12) United States Patent
Sabharwall et al.

(10) Patent No.: US 11,708,914 B2
(45) Date of Patent: Jul. 25, 2023

(54) PHASE-CHANGE VALVES AND RELATED METHODS

(71) Applicants:Battelle Energy Alliance, LLC, Idaho Falls, ID (US); University of Idaho, Moscow, ID (US); Paul Marotta, Jersey City, NJ (US)

(72) Inventors: Piyush Sabharwall, Idaho Falls, ID (US); Richard N. Christensen, Idaho Falls, ID (US); Paul Marotta, Jersey City, NJ (US)

(73) Assignees: Battelle Energy Alliance, LLC, Idaho Falls, ID (US); University of Idaho, Moscow, ID (US); Paul Marotta, Jersey, NJ (US)

( * ) Notice: Subject to any disclaimer, the term of this patent is extended or adjusted under 35 U.S.C. 154(b) by 0 days.

(21) Appl. No.: 17/453,980

(22) Filed: Nov. 8, 2021

(65) Prior Publication Data
US 2022/0163130 A1    May 26, 2022

Related U.S. Application Data

(60) Provisional application No. 63/117,821, filed on Nov. 24, 2020.

(51) Int. Cl.
*F16K 49/00*    (2006.01)
*F16K 31/00*    (2006.01)
(Continued)

(52) U.S. Cl.
CPC .......... *F16K 31/002* (2013.01); *F16K 13/00* (2013.01); *F16K 49/005* (2013.01); *F16K 49/007* (2013.01); *G05D 7/01* (2013.01)

(58) Field of Classification Search
CPC ...... F16K 13/00; F16K 31/002; F16K 49/005; F16K 49/007; G05D 7/01
See application file for complete search history.

(56) References Cited

U.S. PATENT DOCUMENTS

| | | | | | |
|---|---|---|---|---|---|
| 289,277 | A | * | 11/1883 | Leadley | ................ F16K 49/007 137/340 |
| 567,011 | A | * | 9/1896 | Smith | .................... F16K 49/007 137/340 |

(Continued)

OTHER PUBLICATIONS

Engineering ToolBox, (2009) Material Properties, [online] Available at: https://www.engineeringtoolbox.com/material-properties-t_24.html [Accessed Nov. 3, 2021] 18 pages.

(Continued)

*Primary Examiner* — Umashankar Venkatesan
(74) *Attorney, Agent, or Firm* — TraskBritt

(57) ABSTRACT

Valves may include an opening sized and shaped to permit a subject fluid to flow through the opening when the opening is unobstructed. A heat exchange element may be located proximate to the opening, the heat exchange element positioned and configured to induce a localized phase change in the subject fluid to form and unform a solid plug from the subject fluid around at least a portion of the heat exchange element. A heat transfer rate of the heat exchange element may be variable to control a rate of flow of the subject fluid through the valve by controlling a size of the solid plug from the subject fluid.

20 Claims, 8 Drawing Sheets

(51) Int. Cl.
*G05D 7/01* (2006.01)
*F16K 13/00* (2006.01)

(56) References Cited

U.S. PATENT DOCUMENTS

| | | | | |
|---|---|---|---|---|
| 1,526,718 | A * | 2/1925 | Opp | E03B 7/12 |
| | | | | 137/60 |
| 2,823,696 | A * | 2/1958 | Detlefson | F16K 49/005 |
| | | | | 137/340 |
| 4,083,478 | A * | 4/1978 | McLane | B22D 39/00 |
| | | | | 222/592 |
| 6,325,092 | B1 * | 12/2001 | Pirkle | F16K 31/002 |
| | | | | 251/149.6 |
| 6,799,595 | B1 | 10/2004 | Salan et al. | |
| 10,125,576 | B2 * | 11/2018 | McHugh | G05D 7/0635 |
| 10,794,263 | B2 * | 10/2020 | Lee | G05D 23/022 |
| 10,941,698 | B2 * | 3/2021 | Quix | F02B 29/0443 |
| 10,961,864 | B2 * | 3/2021 | Miranda | F01D 17/141 |
| 11,187,345 | B2 * | 11/2021 | Srinivasa | F16K 7/126 |
| 11,199,274 | B2 * | 12/2021 | Kunberger | F16K 17/40 |
| 11,236,838 | B2 * | 2/2022 | Ham | F16K 31/002 |
| 11,578,641 | B2 * | 2/2023 | Kardos | F01P 7/16 |
| 2017/0191373 | A1 * | 7/2017 | Miranda | F01D 17/141 |
| 2018/0321698 | A1 * | 11/2018 | Watts | G05D 23/025 |

OTHER PUBLICATIONS

Shiotsu et al., "Film boiling heat transfer from a wire to upward flow of liquid hydrogen and liquid nitrogen", IOP Conf. Series: Materials Science and Engineering, vol. 101 (2015) 8 pages.

* cited by examiner

US 11,708,914 B2

PHASE-CHANGE VALVES AND RELATED METHODS

CROSS-REFERENCE TO RELATED APPLICATION

This application claims the benefit under 35 U.S.C. § 119(e) of U.S. Provisional Patent Application Ser. No. 63/117,821, filed Nov. 24, 2020, the disclosure of which is hereby incorporated herein in its entirety by this reference.

STATEMENT REGARDING FEDERALLY SPONSORED RESEARCH OR DEVELOPMENT

The subject matter of this disclosure was made with U.S. Government support under Contract Number DE-AC07-05-ID14517 awarded by the Department of Energy, to Battelle Energy Alliance, LLC. The U.S. Government has certain rights in the claimed invention.

FIELD

This disclosure relates generally to valves for controlling flow rates of subject fluids. More specifically, disclosed embodiments relate to valves that may utilize a phase change in the subject fluid to control the flow rate of the subject fluid through the valves.

BACKGROUND

Valves of many different configurations are utilized to control and regulate the flow of subject fluids within fluid communication networks. For example, globe valves typically use a plug that engages with a seat to control the rate of flow of a subject fluid through a pipeline. As the plug is moved into contact with the seat, surfaces of the plug may engage with, and abut against, corresponding surfaces of the seat to impede flow of the subject fluid through the valve. Moving the plug out of contact with the seat, such as by disengaging the surfaces of the plug from the corresponding surfaces of the seat, may enable the subject fluid to flow through the valve. The distance between the plug and the seat may control the rate at which the subject fluid is permitted to flow through the valve.

As another example, diaphragm valves typically use an actuator to move a diaphragm to control the rate of flow of a subject fluid. As the actuator forces the diaphragm on one side of a flow path toward the other side of a flow path (e.g., a saddle, a weir, a seat), the flowable area decreases and may be completely obstructed to impede flow of the subject fluid through the valve. Moving the actuator away from the other side of the flow path may permit the diaphragm to move away from the other side, increasing the flowable area and enabling the subject fluid to flow through the valve. The distance between the diaphragm and the other side of the flow path may control the rate at which the subject fluid is permitted to flow through the valve.

As another example, needle valves typically use a plunger having a varying cross-sectional area (conventionally resembling a needle) and movable with respect to a flow path to control the rate of subject fluid. As the plunger moves toward a portion of the flow path having a defined cross-sectional area, the varying cross-sectional area of the plunger may restrict the flowable area to impede flow of the subject fluid through the valve. Moving the plunger away from the portion of the flow path having the defined cross-sectional area may increase the flowable area, enabling the subject fluid to flow through the valve. The position of the plunger and the rate at which the cross-sectional area of the plunger varies may control the rate at which the subject fluid is permitted to flow through the valve.

BRIEF SUMMARY

In some embodiments, globe valves may include a seat defining an opening sized and shaped to permit a subject fluid to flow through the opening of the seat when the opening is unobstructed. A heat exchange element may be located proximate to the opening of the seat, the heat exchange element positioned and configured to induce a localized phase change in the subject fluid to form a uniform solid plug from the subject fluid around at least a portion of the heat exchange element. A heat transfer rate of the heat exchange element may be variable to control a rate of flow of the subject fluid through the valve by controlling a size of the solid plug from the subject fluid.

In other embodiments, valves for controlling a rate of flow of a subject fluid through a pipe may include a heat exchange element surrounding at least a section of the pipe, the heat exchange element positioned and configured to induce a localized phase change in the subject fluid to solidify, grow, shrink, and melt a plug of a subject solid around at least a portion of an inner surface of the pipe. A heat transfer rate of the heat exchange element may be variable to control a rate of flow of the subject fluid through the pipe by controlling a cross-sectional size of a flowable region within the pipe.

In other embodiments, methods of operating valves for controlling a rate of flow of a subject fluid through a pipe may involve growing a plug of a subject solid proximate to a heat exchange element responsive to increasing a heat transfer rate of the heat exchange element to reduce a flow rate of a subject fluid through a valve. The plug of the subject solid may shrink responsive to decreasing the heat transfer rate of the heat exchange element to increase the flow rate of the subject fluid through the valve.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings. In the drawings:

DETAILED DESCRIPTION

Figure 1:
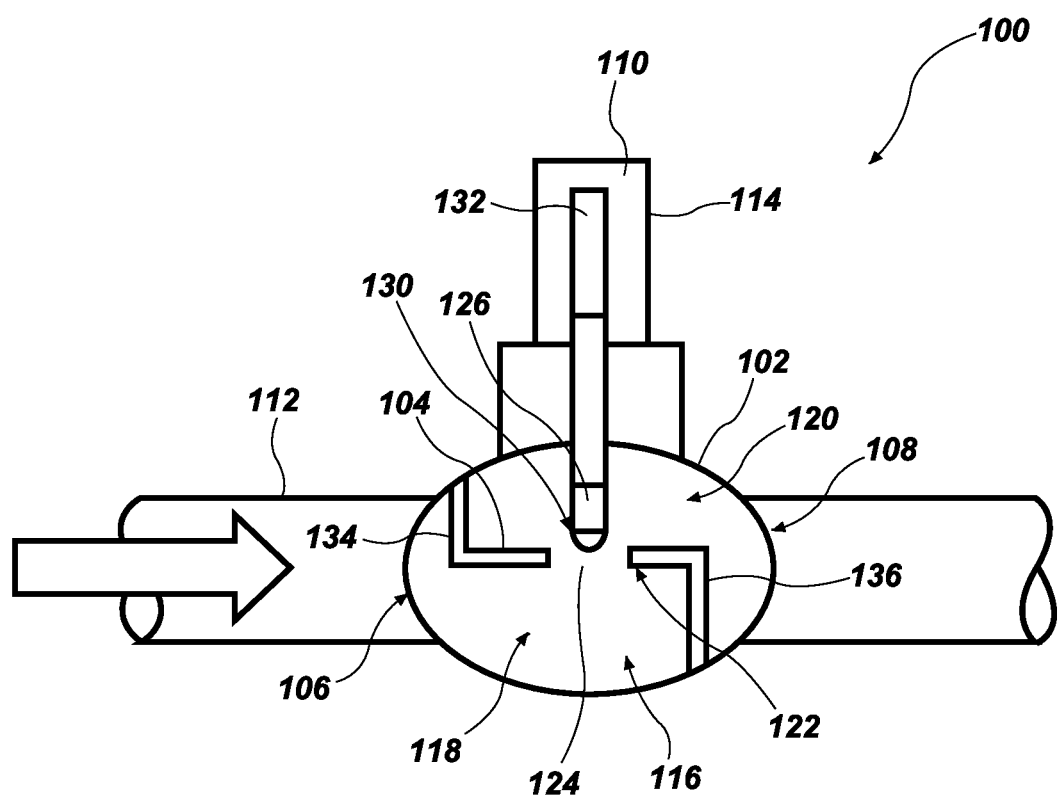
FIG. 1 is a cross-sectional, schematic side view of a globe valve in accordance with this disclosure.

The illustrations presented in this disclosure are not meant to be actual views of any particular valve or component thereof, but are merely idealized representations employed to describe illustrative embodiments. Thus, the drawings are not necessarily to scale.

Disclosed embodiments relate generally to valves that may utilize a phase change in a subject fluid to control the flow rate of the subject fluid through the valves. More specifically, disclosed are embodiments of valves that may increase (e.g., solidify, freeze, grow) or decrease (e.g., shrink, liquefy, melt) the size of subject solid plugs formed from the subject fluid by controlling a heat transfer rate of a heat exchange element located proximate to the subject fluid. The valves may be configured to transition between open and closed states by increasing or decreasing a size of the subject solid plug, and to provide control of the flow rate of the subject fluid through the valves. For example, by monitoring the flow rate of the subject fluid, the heat transfer rate of the heat exchange element, and optionally the temperatures of the subject fluid, the heat exchange element, and any coolant used in connection with the heat exchange element, the size of the subject solid plug, and resulting size of a flowable cross-sectional area for the subject fluid through the valve, may be controllable by controlling the heat transfer rate of the heat exchange element.

In some examples, the valve and the heat exchange element may be configured as a globe valve. For example, a portion of the heat exchange element configured to absorb heat may be positioned proximate to a seat of the globe valve. Controlling a heat transfer rate of the heat exchange element may cause the subject fluid to freeze and form a plug proximate to the portion of the heat exchange element. Growth of the plug may inhibit flow of the subject fluid through the globe valve and shrinkage of the plug may enable flow (e.g., increased flow) of the subject fluid through the globe valve.

In other examples, the valve and the heat exchange element may be configured as a diaphragm valve. For example, a portion of the heat exchange element configured to absorb heat may be positioned proximate to a diaphragm of the valve. Controlling a heat transfer rate of the heat exchange element may cause a first subject fluid to freeze and form a plug proximate to the diaphragm. Growth of the plug may elastically deform the diaphragm to decrease a flowable area through the diaphragm valve, inhibiting flow of a second subject fluid through the diaphragm valve, and shrinkage of the plug may enable the diaphragm to elastically deform to increase the flowable area, enabling flow (e.g., increased flow) of the subject fluid through the diaphragm valve.

In other examples, the valve and the heat exchange element may be configured as a needle valve. For example, a portion of the heat exchange element configured to absorb heat may be positioned proximate to a portion of the flow path having a defined cross-sectional area. Controlling a heat transfer rate of the heat exchange element may cause a subject fluid to freeze and form a plug proximate to the defined cross-sectional area. Growth of the plug may occupy a portion of the defined cross-sectional area to decrease a flowable area through the needle valve, inhibiting flow of a second subject fluid through the needle valve, and shrinkage of the plug may free a portion of the defined cross-sectional area to increase the flowable area, enabling flow (e.g., increased flow) of the subject fluid through the needle valve.

Such valves and other valves in accordance with this disclosure may reduce (e.g., eliminate) reliance on moving mechanical parts exposed to the subject fluid, as well as reduce (e.g., eliminate) reliance on contact between surfaces to form a seal in a closed state of the valve. This functionality may be of particular utility in applications where the subject fluid is corrosive, radioactive, in a high temperature environment, in a high-pressure environment, or any combination or subcombination of these. For example, valves in accordance with this disclosure may be of particular use in controlling the rate of flow for molten salt used in connection with nuclear reactors utilizing dissolved fuel.

As used herein, the terms "substantially" and "about" in reference to a given parameter, property, or condition means and includes to a degree that one of ordinary skill in the art would understand that the given parameter, property, or condition is met with a degree of variance, such as within acceptable manufacturing tolerances. For example, a parameter that is substantially or about a specified value may be at least about 90% the specified value, at least about 95% the specified value, at least about 99% the specified value, or even at least about 99.9% the specified value.

As used herein, the term "heat exchange element" means and includes devices and structures positioned and configured to transfer heat from within a valve to surrounding environment (e.g., to a coolant) or transfer or generate heat within the valve. For example, heat exchange elements include heat exchangers, heat pipes, thermosiphons, bayonets, thermoelectric coolers, heat pumps, and other heaters and coolers. Heat exchange elements may alternatively be referred to as "heat exchangers," "heat transfer devices," or a "heating and cooling apparatus."

Terms discussing relative positioning between components, as used herein, refer to the orientation and positioning shown in the associated drawings. For example, the terms "upper" and "lower" mean and include upper and lower positions as shown in the orientation specifically depicted in the relevant drawing herein. When valves in accordance with this disclosure are in orientations other than those specifically shown herein, terms of relative positioning will require recontextualizing to match the reorientation of the relevant components.

FIG. 1 is a cross-sectional, schematic side view of a valve 100 in accordance with this disclosure. The valve 100 shown in FIG. 1 is specifically configured as a globe valve 100, although valves within the scope of this disclosure may have other configurations, such as, for example, a straight-through diaphragm valve or a needle valve.

The globe valve 100 may include a body 102 sized and shaped to house at least portions of components of the globe valve 100 and to contain a flowable area restrictable to control flow of a subject fluid through the globe valve 100. For example, the body 102 may generally be an at least partially hollow three-dimensional prismatic (e.g., ovoid, spheroid, ellipsoid) shape. The body 102 may include an inlet opening 106 and an outlet opening 108 to enable a subject fluid to flow through the body 102 when the globe valve 100 is in an open state, as shown in FIG. 1. The inlet opening 106 and the outlet opening 108 may mate with a pipe 112 configured to carry the subject fluid, such as, for example, by being located in line with the pipe 112, enabling the globe valve 100 to control the rate of flow of the subject fluid through the pipe 112.

Subject fluids controllable utilizing the globe valve 100 of FIG. 1, and other valves in accordance with this disclosure, may include corrosive materials, radioactive materials, and other materials difficult to handle utilizing conventional valves having moving mechanical parts. For example, the subject fluid, and resultant plug of solidified subject material, may include a salt material (e.g., a dissolved fuel for a nuclear reactor), a liquid metal material, a fusible alloy, or water. More specifically, the subject material may include, for example, a fluoride salt, a thorium salt, a chloride salt, a lithium salt, a salt mixture, a mercury-containing alloy, an alkali metal-containing alloy, a gallium-containing alloy, a bismuth-containing alloy, a lead-containing alloy, a tin-containing alloy, a zinc-containing alloy, an indium-containing alloy, an indium-containing alloy, a thallium-containing alloy, Wood's metal, Field's metal, Rose metal, Galinstan, a sodium-potassium alloy, or any combination or subcombination of these materials.

The subject fluid may be formulated to exhibit a phase change, such as from a liquid phase to a solid phase or from a solid phase to a liquid phase, under conditions where the valve is in use and operation. For example, an operating temperature of subject fluid, as measured in degrees Celsius, may be about 25% or less higher than a freezing temperature of the subject fluid when the subject fluid is proximate to the inlet opening 106 of the globe valve 100, at a given operating pressure. More specifically, the operating temperature of subject fluid, as measured in degrees Celsius, may be, for example, between about 1% and about 20% higher than the freezing temperature of the subject fluid when the subject fluid is located proximate to the inlet opening 106 of the globe valve 100. As a specific, nonlimiting example, the operating temperature of subject fluid, as measured in degrees Celsius, may be, for example, between about 2.5% and about 15% (e.g., about 5%, about 10%) higher than the freezing temperature of the subject fluid when the subject fluid is located proximate to the inlet opening 106 of the globe valve 100.

The globe valve 100 may include a seat 104 generally shaped and positioned to divide a cavity 116 defined by the body 102 into an upstream portion 118 and a downstream portion 120. The seat 104 may also define an opening 122 providing fluid communication between the upstream portion 118 and the downstream portion 120 when the opening 122 is unobstructed or only partially obstructed. For example, the seat 104 may include two generally L-shaped flanges 134 and 136, one L-shaped flange 134 extending downward from an upper portion of the body 102 and laterally inward toward a geometric center of the cavity 116 of the body 102, and the other L-shaped flange 136 extending upward from a lower portion of the body 102 and laterally inward toward a geometric center of the cavity 116 of the body 102. The L-shaped flanges 134 and 136 may cooperatively define the opening 122 between laterally extending portions of the respective L-shaped flanges 134 and 136.

Figure 2:
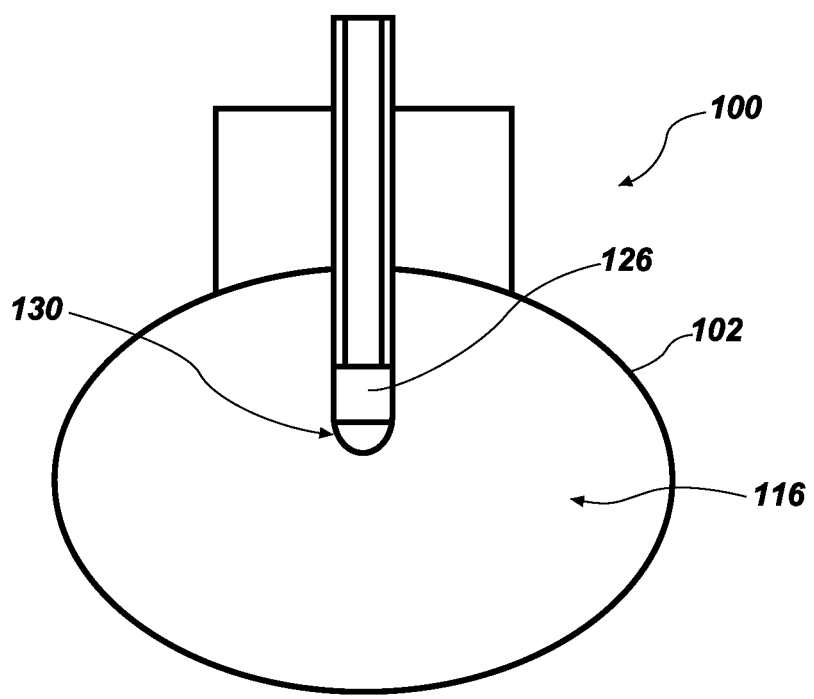
FIG. 2 is an enlarged, cross-sectional, schematic side view of a portion of the globe valve of FIG. 1.

FIG. 2 is an enlarged, cross-sectional, schematic side view of a portion of the globe valve 100 of FIG. 1. Specifically, FIG. 2 depicts an enlarged view of the body 102 focusing on the portion of a heat exchange element 126 located within the body 102. For the sake of clarity in focusing on the heat exchange element 126, the seat 104 (see FIG. 1) has not been depicted in FIG. 2.

With combined reference to FIG. 1 and FIG. 2, the globe valve 100 may include a heat exchange element 126, at least a portion of which may be located proximate to the opening 122 in the seat 104. The heat exchange element 126 may be positioned and configured to induce a localized phase change in the subject fluid to solidify, grow, shrink, or melt a plug of a subject solid around at least a portion of the heat exchange element 126. For example, the heat exchange element 126 may be configured to transfer heat from the subject fluid to a heat sink, such as a coolant and/or the surrounding environment, to freeze the subject fluid on and around at least a portion of the heat exchange element 126 by increasing the heat transfer rate of the heat exchange element 126. Continuing the example, the heat exchange element 126 may be configured to reduce the rate at which it transfers heat from the subject fluid to the heat sink to melt at least a portion of the solidified, subject solid on and around at least a portion of the heat exchange element 126 by decreasing the heat transfer rate of the heat exchange element 126. In some examples, the heat exchange element 126 may be configured to actively heat the subject solid to cause the at least a portion of the subject solid to melt, decreasing the size of the subject solid.

The heat exchange element 126 may include, for example, a heat exchanger, a heat pipe, a thermosiphon, a bayonet heat exchange element (e.g., a liquid-metal-cooled bayonet heat exchange element) a thermoelectric cooler, a heat pump, other heaters and coolers, or any combination or subcombination of these. In the embodiment specifically shown in FIG. 1 and FIG. 2, the heat exchange element 126 may be configured as a heat pipe. The heat pipe of the heat exchange element 126 may include an evaporator end 130 located proximate to the opening 122 in the seat 104 within the body 102 of the globe valve 100. For example, the heat exchange element 126 may extend from a location outside the cavity 116, through a sealed opening in the body 102, to a predetermined location within the body 102 to position the evaporator end 130 proximate to the seat 104.

The heat exchange element 126 may remain spaced from the seat 104 to define a flowable space 124 (e.g., a cross-sectional flow area) between the upstream portion 118 and the downstream portion 120 of the cavity 116. A shortest distance between the heat exchange element 126 and the seat 104 may depend, at least in part, on the ability of the heat exchange element 126 to solidify a sufficiently large plug of the previously fluid subject material to enable the globe valve 100 to transition from the open state shown in FIG. 1, to a flow-controlling state, and to a closed state.

A heat transfer rate of the heat exchange element 126 may be variable to control a rate of flow of the subject fluid through the glove globe valve 100 by controlling a size of the plug of the subject solid. For example, when the globe valve 100 is in the open state depicted in FIG. 1, the heat exchange element 126 may not actively transfer heat away from the subject fluid. As another example, the heat exchange element 126 may be operating at or near a minimum heat transfer rate achievable for the heat exchange element 126 when the globe valve 100 is in the open state. As a result, any previously formed plug of solidified subject material may melt (e.g., to a greater degree than a previous solidified mass, completely) responsive to heat from the subject fluid, and the flowable space 124 between the heat exchange element 126 and the seat 104 may be at its maximum. More specifically, a working fluid of the heat pipe of the heat exchange element 126 may be at least substantially isothermal at the temperature of the subject fluid, and the working fluid may be saturated, superheated vapor when the globe valve 100 is in the open state.

Figure 3:
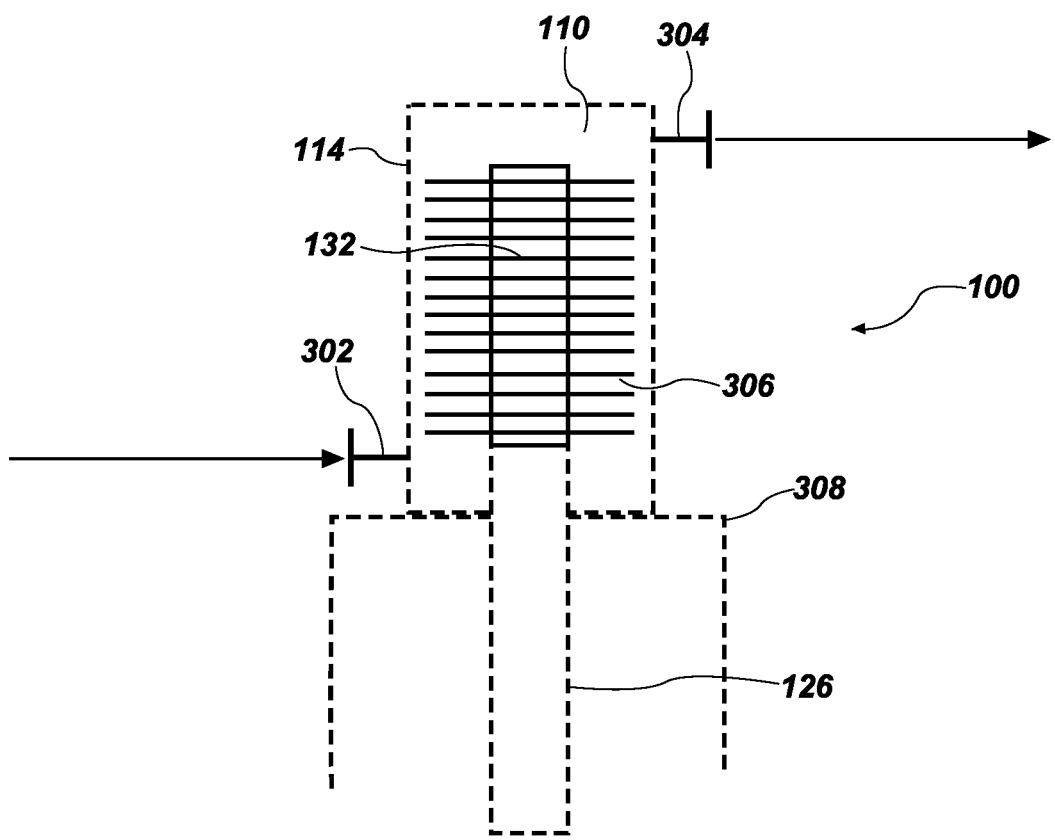
FIG. 3 is an enlarged, cross-sectional, schematic side view of another portion of the globe valve of FIG. 1.

FIG. 3 is an enlarged, cross-sectional, schematic side view of another portion of the globe valve 100 of FIG. 1. Specifically, FIG. 3 depicts an enlarged view of the body 102 focusing on the portion of a heat exchange element 126 located outside the body 102.

With combined reference to FIG. 1 and FIG. 3, a portion of the heat exchange element 126 distal from the seat 104 may be configured to vary a heat transfer rate of the heat exchange element 126, enabling the portion of the heat exchange element 126 proximate to the seat 104 to control the size of any plug of subject material within the body 102. For example, the globe valve 100 may include a thermally insulating material interposed between the portion of the heat exchange element 126 located within the body 102 and the portion of the heat exchange element 126 located outside the body 102, though the thermally insulating material may not impede an ability of the heat exchange element 126 to transfer heat from within the body to the exterior of the body 102. More specifically, the globe valve 100 may include a factory seal weld at the location where the heat exchange element 126 passes from the exterior to the cavity 116 of the body 102 and a thermally insulating material 308 at an exterior of the body 102 in a location between the evaporator end 130 and the condenser end 132 of the heat exchange element 126 (not within the heat exchange element 126 itself).

In addition, the heat exchange element 126 may be thermally coupled to a heat sink 306, may be exposed to a coolant, or both. For example, the heat exchange element 126 may include a heat sink 306 thermally coupled to a portion of the heat exchange element 126 at an exterior of the body 102. More specifically, the heat exchange element 126 may include a heat sink 306 thermally coupled to the condenser end 132 of the heat exchange element 126. As another example, at least a portion of the heat exchange element 126 located outside the body 102 of the globe valve 100 may be exposed to another flowable space 110 for exposure to a coolant. The other flowable space 110 may be isolated, thermally and in terms of fluid communication, from the flowable space 124 through the seat 104. More specifically, the condenser end 132 of the heat exchange element 126, including the heat sink 306 thermally coupled thereto, may be located within a housing 114 having an inlet valve 302 and an outlet valve 304. The inlet valve 302 and the outlet valve 304 may be connected to, for example, a source of coolant and a recirculator for the coolant, enabling the coolant to flow through the other flowable space 110 and facilitate heat transfer from the heat exchange element 126 to the coolant and the surrounding environment. Stated another way, the inlet valve 302 may be configured to regulate flow of a coolant to the other flowable space 110 and the outlet valve 304 may be configured to permit the coolant to exit the other flowable space 110 to modulate the heat transfer rate of the heat exchange element 126.

The coolant may include, for example, a fluid having a sufficiently high thermal conductivity and thermal capacity, sufficiently low rates of expansion in response to temperature changes, and sufficiently low chemical interactions with the materials of the housing 114, inlet valve 302 and outlet valve 304. More specifically, the coolant may include, for example, an environmental fluid, an inert fluid, a cryogenic fluid, or a liquid metal. As specific, nonlimiting examples, the coolant may include air, argon, helium, a cryogenic liquid that flashes (e.g., volatilizes) to gas when absorbing heat from the heat exchange element 126 (e.g., argon, helium, hydrogen, nitrogen, oxygen, methane, any combination or subcombination of the foregoing), or a liquid metal configured to remain in a liquid phase over an operating temperature range for the heat exchange element 126 (e.g., mercury, tin, lead, cesium, gallium, francium, any alloy, combination, or subcombination of the foregoing).

When transitioning from the open state of FIG. 1 to a flow-controlling state or a closed state, a heat transfer rate of the heat exchange element 126 may be increased. The increase in heat transfer rate may cause a localized phase change in the subject fluid proximate to the portion of the heat exchange element 126 within the body 102, causing a plug of the subject material to solidify and reduce, or cut off, flow of the subject fluid through the globe valve 100. For example, the rate at which coolant is permitted to flow through the other flowable space 110 may be increased to increase the heat transfer rate of the heat exchange element 126 and modulate the size of the plug of the subject solid.

While FIG. 1 through FIG. 3 have been shown and described primarily in connection with an embodiment where the heat exchange element 126 is configured as a heat pipe, other configurations for the heat exchange element 126 are possible. For example, the heat exchange element 126 may be configured as a heat exchanger, a thermosiphon, a bayonet heat exchange element, a thermoelectric cooler, a heat pump, other heaters and/or coolers, or any combination or subcombination of these.

Figure 4:
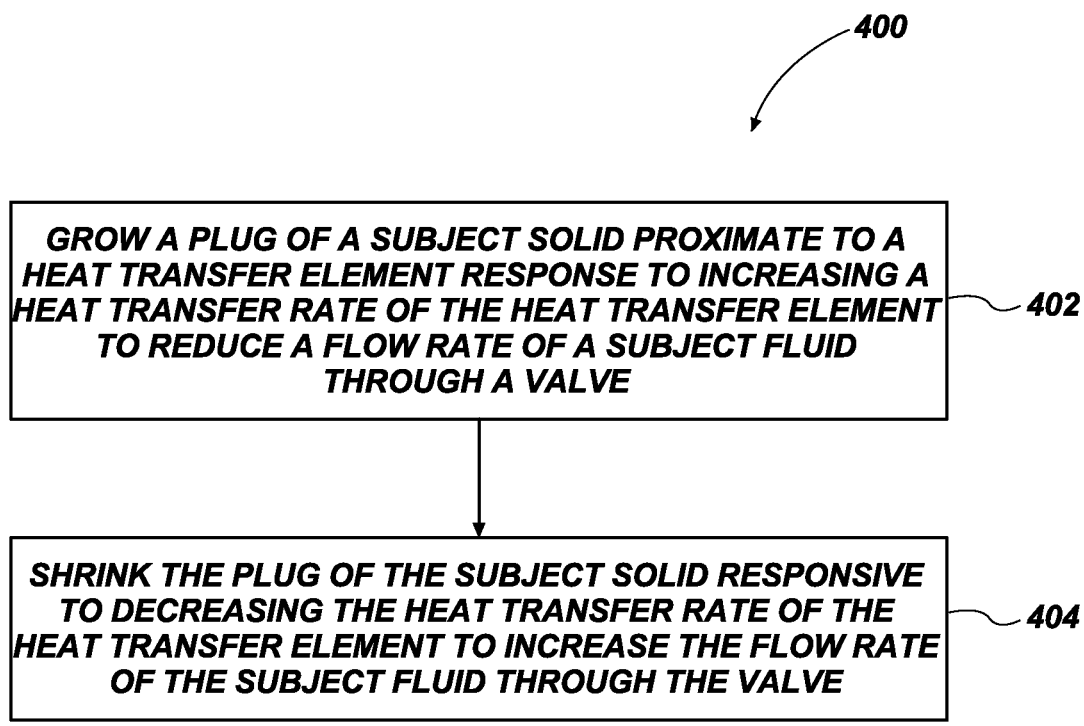
FIG. 4 is a flowchart of a method of operating a valve in accordance with this disclosure.
Figure 5:
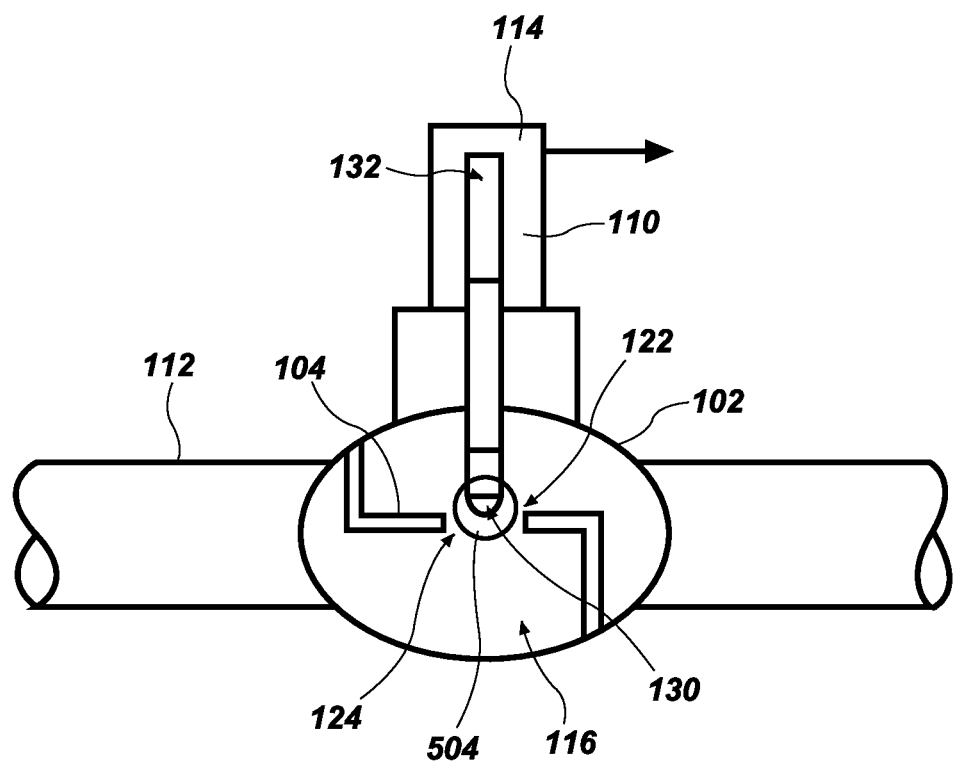
FIG. 5 is a cross-sectional, schematic side view of the globe valve of FIG. 1 in a flow-rate-controlling state.

FIG. 4 is a flowchart of a method 400 of operating a valve in accordance with this disclosure. FIG. 5 is a cross-sectional, schematic side view of the globe valve 100 of FIG. 1 in a flow-rate-controlling state. With combined reference to FIG. 4 and FIG. 5, the method 400 may involve increasing a size of (e.g., growing) a plug 504 of a subject solid proximate to the heat exchange element 126 responsive to increasing a heat transfer rate of the heat exchange element 126 to at least temporarily reduce a flow rate of a subject fluid through the globe valve 100, as indicated at act 402. For example, the volumetric flow rate of coolant across the condenser end 132 of the heat exchange element 126 may be increased to increase the heat transfer rate of the heat exchange element 126. As a result, the working fluid of the heat pipe of the heat exchange element 126 may condense proximate to the condenser end 132, enabling the working fluid to evaporate and remove heat from the subject fluid in the interior of the body 102 at the evaporator end 130.

When the heat transfer rate of the heat exchange element 126 increases, the plug 504 of the solidified subject material may nucleate and grow around the portion of the heat exchange element 126 within the body 102. When the globe valve 100 is in a flow-controlling state, as shown in FIG. 5, the flowable space 124 may remain between the plug 504 and the opening 122 in the seat 104. While the flowable space 124 may be constricted when compared to the open state of FIG. 1, the subject fluid may continue to flow through the 124, and through the globe valve 100, when the globe valve 100 is in the flow-controlling state of FIG. 5.

The size of the plug 504, and resultant size of the flowable space 124 may determine the flow rate of the subject fluid through the globe valve 100. In some examples, control over the inlet valve 302, outlet valve 304, flow rate of coolant through the other flowable space 110, or any combination or subcombination of these may be automatically controlled, and may be calibrated, to enable the globe valve 100 to target specific flow rates when the globe valve 100 is in the flow-controlling state. For example, growth of the plug 504 may become increasingly difficult to achieve as the size of the plug 504 increases. More specifically, distance between the evaporator end 130 and the subject fluid may increase as the plug 504 grows, the plug 504 may insulate the subject fluid from the heat exchange element 126, and other illustrative conditions may render continued growth of the plug 504 more difficult. As a specific, nonlimiting example, linear increases in a diameter of the plug 504 may require corresponding exponential increases in a heat transfer rate of the heat exchange element 126 to achieve continued growth. Specific heat transfer rates of the heat exchange element 126, and corresponding changes in operation to achieve those heat transfer rates, may be calibrated based on the heat transfer rates achievable by the heat exchange element 126, operational parameters to achieve those heat transfer rates, characteristics of the coolant (e.g., heat capacity), characteristics of the subject fluid (e.g., latent heat of fusion, heat capacity, flow rate), and other system variables affecting the ability of the globe valve 100 to nucleate and grow the plug 504 may be calibrated to achieve a target flow rate of the subject fluid through the globe valve 100.

Figure 6:
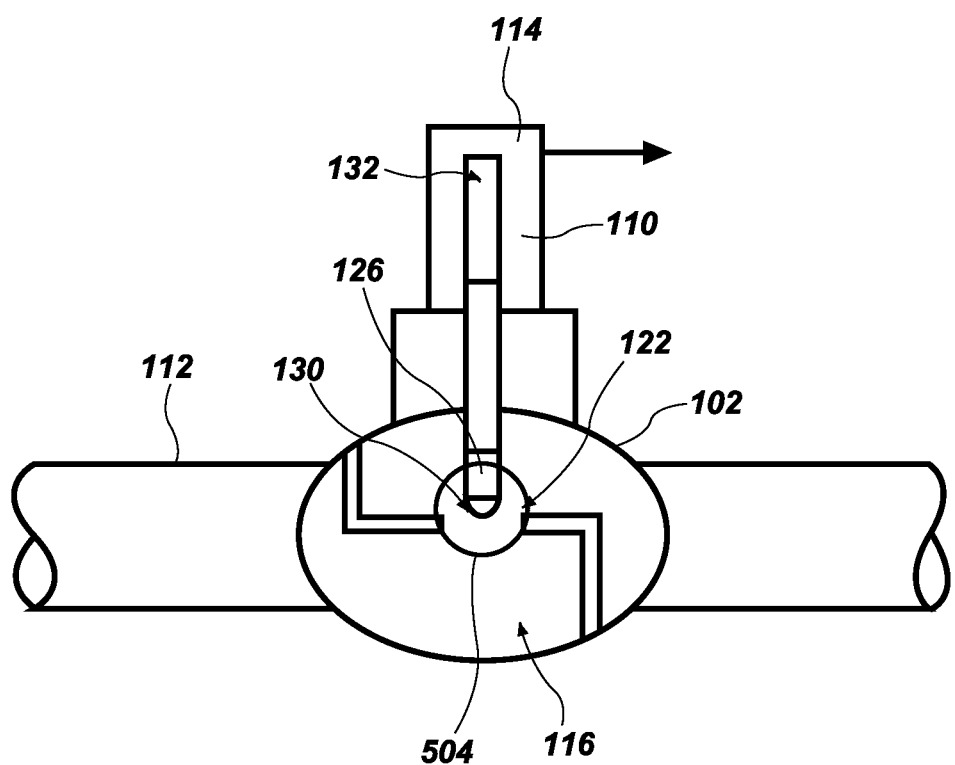
FIG. 6 is a cross-sectional, schematic side view of the globe valve of FIG. 1 in a closed state.

FIG. 6 is a cross-sectional, schematic side view of the globe valve 100 of FIG. 1 in a closed state. With combined reference to FIG. 4 and FIG. 6, act 402 of the method 400 may also involve, for example, growing the plug 504 to the point where globe valve 100 is at least temporarily in a closed state, as shown in FIG. 6. For example, the plug 504 may grow to contact the seat 104, occluding the opening 122 in the seat 104 and impeding flow of the subject fluid through the globe valve 100. More specifically, the plug 504 may completely obstruct the opening 122 in the seat 104 and inhibit (e.g., stop) all flow of the subject fluid through the globe valve 100. Growing the plug 504 to a size where all flow of the subject fluid through the globe valve 100 is stopped may involve further increasing the heat transfer rate of the heat exchange element 126.

When an increase in the flow rate of the subject fluid through the globe valve 100 is desired, the method 400 may involve decreasing a size of (e.g., shrinking) the plug 504 of the subject solid responsive to decreasing the heat transfer rate of the heat exchange element 126, as indicated at act 404. Such an increase in the flow rate of the subject fluid through the globe valve 100 may cause the globe valve 100 to transition from the closed state of FIG. 6 to the flow-controlling state of FIG. 5 or the open state of FIG. 1, to transition from the flow-controlling state of FIG. 5 to the open state of FIG. 1, or simply to transition from a first flow-controlling state at a first flow rate of the subject fluid to a second flow-controlling state at a second, higher flow rate of the subject fluid.

For example, the volumetric flow rate of coolant across the condenser end 132 of the heat exchange element 126 may be decreased or stopped to decrease the heat transfer rate of the heat exchange element 126. As a result, the working fluid of the heat pipe of the heat exchange element 126 may condense proximate to the condenser end 132 to a lesser degree, reducing the availability of condensed quantities of the working fluid at the evaporator end 130 to evaporate and remove heat from the subject fluid in the interior of the body 102. When the heat transfer rate of the heat exchange element 126 decreases, the plug 504 of the solidified subject material may shrink, increasing the size of the flowable space 124 between the plug 504 and the seat 104. Shrinkage of the plug 504 may continue, potentially to the point where no plug 504 remains and the flowable space 124 is defined between the condenser end 132 of the heat exchange element 126 and the opening 122 of the seat 104.

In examples where the valve is configured as a diaphragm valve, the valve may include a heat exchange element extending from an exterior of a body of the valve, through an opening in the body, to a location proximate to a diaphragm of the diaphragm valve. The valve may also include a first subject fluid or a first mass of a subject fluid on a heat-exchanger-facing side of the diaphragm, and a second subject fluid or a second, flowing mass of the subject fluid on an opposite side of the diaphragm. Growth of a plug of the first subject fluid or first mass of the subject fluid on the heat-exchanger-facing side of the diaphragm responsive to increases in heat transfer rate of the heat exchange element may cause the plug to contact and expand the diaphragm, decreasing the flowable space on the opposite side of the diaphragm and inhibiting flow of the second subject fluid or the second, flowing mass of the subject fluid. Shrinkage of the plug of the first subject fluid or first mass of the subject fluid on the heat-exchanger-facing side of the diaphragm responsive to decreases in heat transfer rate of the heat exchange element may cause the plug to withdraw from contact with and permit contraction of the diaphragm, increasing the flowable space on the opposite side of the diaphragm and permitting flow of the second subject fluid or the second, flowing mass of the subject fluid.

In examples where the valve is configured as a needle valve, the needle may be configured as, or replaced with, the heat exchange element. Growth of a plug of the subject fluid on and around the heat exchange element proximate to a portion of a flow path in the needle valve having a defined cross-sectional area responsive to increases in heat transfer rate of the heat exchange element may cause the plug to at least partially occlude the defined cross-sectional area, decreasing the flowable space and inhibiting flow of the subject fluid. Shrinkage of the plug of the subject fluid on and around the heat exchange element responsive to decreases in heat transfer rate of the heat exchange element may reduce (e.g., eliminate) occlusion of the defined cross-sectional area, increasing the flowable space and permitting flow of the subject fluid.

Figure 7:
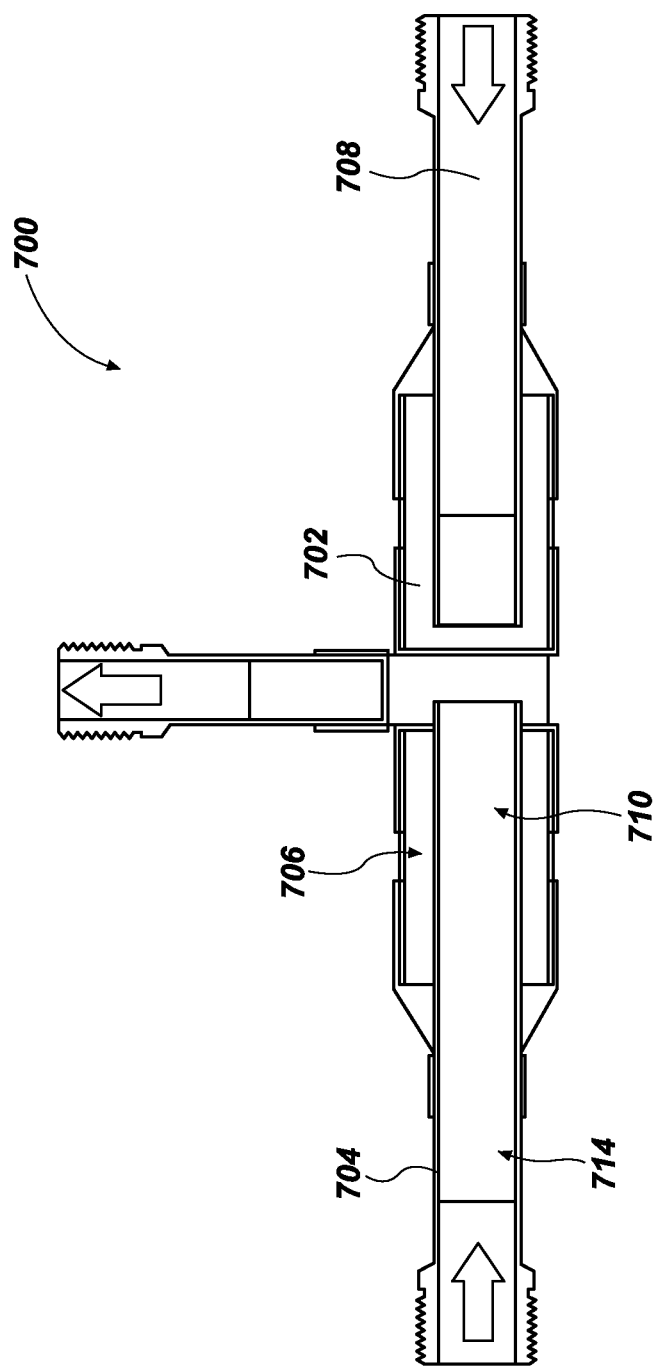
FIG. 7 is a partial cross-sectional side view of another embodiment of a valve in accordance with this disclosure.

FIG. 7 is a partial cross-sectional side view of another embodiment of a valve 700 in accordance with this disclosure. The valve 700 may include a heat exchange element 702 surrounding at least a section of a pipe 704 configured to carry a subject fluid. For example, the heat exchange element 702 may be configured as a chamber 706 having an inner diameter larger than an outer diameter of at least the section of the pipe 704, and the relevant section of the pipe 704 may extend through the chamber 706. Coolant may enter the chamber 706 from a coolant inlet 708, and the coolant in the chamber 706 may absorb heat from the subject fluid through the section of the pipe 704 within the chamber 706. The heat exchange element 702, including the coolant and the chamber 706, may be positioned and configured to induce a localized phase change in the subject fluid to solidify, grow a thickness of, shrink the thickness of, and melt a plug of a subject solid around at least a portion of an inner surface of the section of the pipe 704 carrying the subject fluid. In some examples, valves 700 having the configuration shown in FIG. 7 may be configured to operate primarily in fully open or fully closed states.

A heat transfer rate of the heat exchange element 702 may be variable to control a rate of flow of the subject fluid through the pipe 704 by controlling a cross-sectional size of a flowable region 710 within the pipe 704. For example, increasing the flow rate of the coolant into the chamber 706 may cause a plug of the subject material to nucleate and grow on the inner surface 714 of the pipe 704, reducing the diameter of the pipe 704 through which the subject fluid may flow. This reduction in the flowable region 710 may induce a related reduction in the flow rate of the subject fluid through the pipe 704. Conversely, decreasing or stopping the flow rate of the coolant into the chamber 706 may cause the plug of the subject material to shrink and melt from the inner surface 714 of the 704, increasing the diameter of the pipe 704 through which the subject fluid may flow. This increase in the size of the flowable region 710 may induce a related increase in the flow rate of the subject fluid through the pipe 704.

Figure 8:
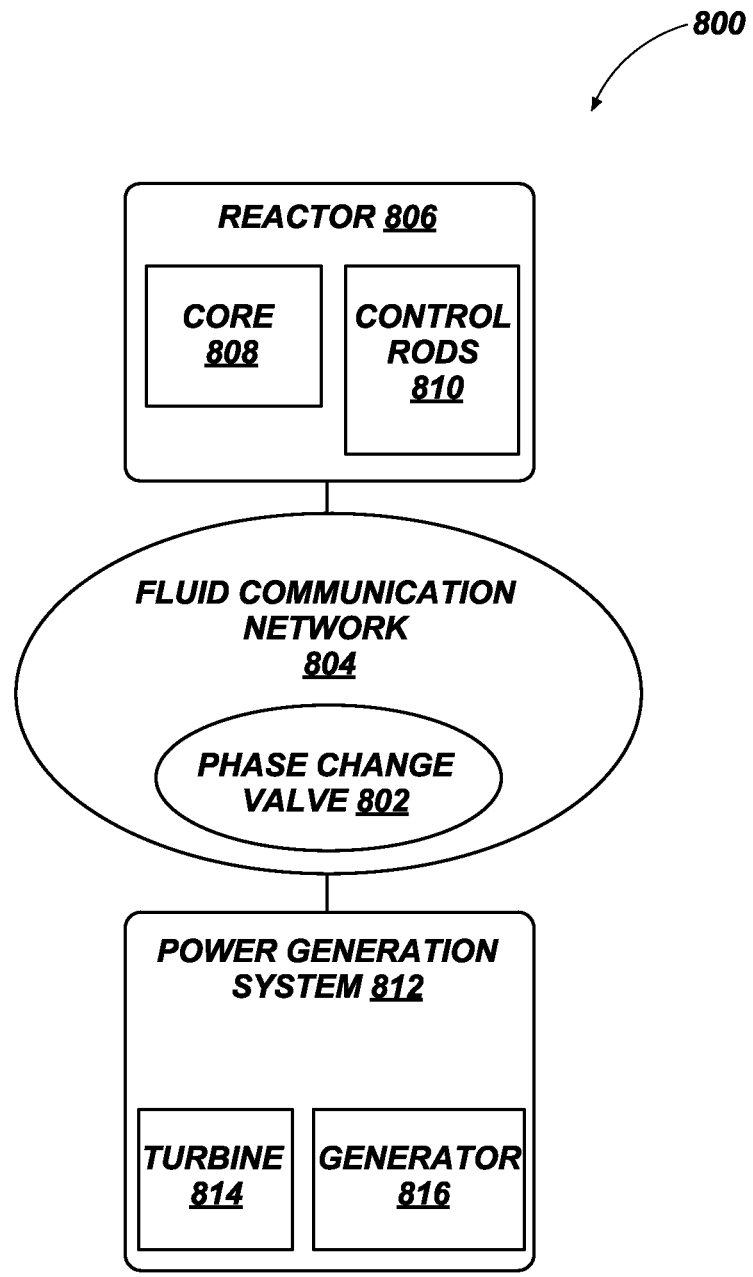
FIG. 8 is a schematic view of a system including a valve in accordance with this disclosure.

FIG. 8 is a schematic view of a system 800 including a phase change valve 802 in accordance with this disclosure. The system 800 shown is specifically configured as a reactor (e.g., a light water reactor, a molten salt reactor). The system 800 may include, for example, a fluid communication network 804 for managing one or more fluids utilized by, contained within, or otherwise present in connection with the system 800. The fluid communication network 804 may include one or more phase change valves 802 in accordance with this disclosure to regulate flow of a subject fluid within one or more portions of the fluid communication network 804. In some examples, the fluid communication network 804 may also include pipes, reservoirs, tanks, valves not reliant on phase changes to regulate flow, pumps, heat exchange elements, and other devices and components for containing, directing, and flowing a subject fluid known in the art.

The system 800 may also include, for example, a reactor 806 configured to generate heat. More specifically, the reactor 806 may include, for example, a core 808 containing a source of heat (e.g., a nuclear fuel source) and control rods 810 configured to reduce the risk of the core 808 overheating. The system 800 may include, for example, a power generation system 812 configured to generate power utilizing heat generated by the reactor. More specifically, the power generation system 812 may include, for example, a turbine 814 configured to convert heat generated by the reactor 806 into mechanical energy and a generator 816 configured to convert mechanical energy generated by the turbine 814 into electrical energy.

The fluid communication network 804 may be connected to each of the reactor 806 and the power generation system 812. For example, the fluid communication network 804 may be configured to carry and move fluid heated by the reactor 806 directly to the power generation system 812 for utilization by the turbine 814 or to a series of heat exchange elements to transfer heat to another fluid for utilization by the turbine 814. The phase change valve 802 or phase change valves 802 may be utilized to regulate flow in one or more portions of the fluid communication network 804.

Valves in accordance with this disclosure may utilize a phase change in a subject fluid to control the flow rate of the subject fluid through the valves. The valves may solidify, grow, shrink, and melt subject solid plugs from the subject fluid by controlling a heat transfer rate of a heat exchange element located proximate to the subject fluid. This operation may enable the valves to transition between open and closed states, and to provide control of a flow rate of the subject fluid through the valves when in flow-controlling states between the open and closed states.

Such valves may reduce (e.g., eliminate) reliance on moving mechanical parts exposed to the subject fluid, as well as reduce (e.g., eliminate) reliance on contact between surfaces to form a seal in a closed state. The valves may, for example, be free of a movable stem in a bonnet. This functionality may be of particular utility in applications where the subject fluid is corrosive and/or radioactive. For example, valves in accordance with this disclosure may be of particular use in controlling the rate of flow for molten salt used in connection with nuclear reactors utilizing dissolved fuel.

While certain illustrative embodiments have been described in connection with the figures, those of ordinary skill in the art will recognize and appreciate that the scope of this disclosure is not limited to those embodiments explicitly shown and described in this disclosure. Rather, many additions, deletions, and modifications to the embodiments described in this disclosure may be made to produce embodiments within the scope of this disclosure, such as those specifically claimed, including legal equivalents. In addition, features from one disclosed embodiment may be combined with features of another disclosed embodiment while still being within the scope of this disclosure.

What is claimed is:

1. A valve, comprising:
    an opening sized and shaped to permit a subject fluid to flow through the opening when the opening is unobstructed; and
    a heat exchange element located proximate to the opening, the heat exchange element positioned and configured to induce a localized phase change in the subject fluid to form and unform a solid plug from the subject fluid around at least a portion of the heat exchange element;
    wherein a heat transfer rate of the heat exchange element is variable to control a rate of flow of the subject fluid through the valve by controlling a size of the solid plug formable from the subject fluid.

2. The valve of claim 1, wherein the heat exchange element comprises a heat pipe, a thermosiphon, or a bayonet.

3. The valve of claim 1, further comprising a heat sink connected to the heat exchange element at a location distal from the opening.

4. The valve of claim 3, wherein a first flowable space around the heat sink is isolated from a second flowable space through the opening.

5. The valve of claim 4, further comprising an inlet valve configured to regulate flow of a coolant to the first flowable space and an outlet valve configured to permit the coolant to exit the first flowable space to modulate the heat transfer rate of the heat exchange element.

6. The valve of claim 4, wherein a body of the valve defining the second flowable space comprises a sealed opening through which the heat exchange element extends.

7. The valve of claim 1, wherein the valve is free of a movable stem in a bonnet.

8. The valve of claim 1, further comprising a thermally insulating material located over exterior surfaces of the valve.

9. The valve of claim 1, wherein the valve is configured as a globe valve, a diaphragm valve, or a needle valve.

10. A valve for controlling a rate of flow of a subject fluid through a pipe, comprising:
    a heat exchange element surrounding at least a section of the pipe, the heat exchange element positioned and configured to induce a localized phase change in the subject fluid to solidify, grow, shrink, or melt a plug of a subject solid around at least a portion of an inner surface of the pipe;
    wherein a heat transfer rate of the heat exchange element is variable to control a rate of flow of the subject fluid through the pipe by controlling a cross-sectional size of a flowable region within the pipe.

11. A method of operating a valve for controlling a rate of flow of a subject fluid through a pipe, comprising:
    growing a plug of a subject solid proximate to a heat exchange element responsive to increasing a heat transfer rate of the heat exchange element to reduce a flow rate of a subject fluid through a valve; and
    shrinking the plug of the subject solid responsive to decreasing the heat transfer rate of the heat exchange element to increase the flow rate of the subject fluid through the valve.

12. The method of claim 11, further comprising at least temporarily maintaining a flowable space proximate to the plug of the subject solid to permit flow of the subject fluid through the space.

13. The method of claim 11, further comprising eliminating a flowable space by growing the plug of the subject solid to close the valve at least temporarily.

14. The method of claim 11, further comprising melting the plug of the subject solid responsive to decreasing the heat transfer rate of the heat exchange element.

15. The method of claim 11, wherein growing the plug of the subject solid comprises reducing a flowable space between the heat exchange element and a seat of a globe valve.

16. The method of claim 11, wherein growing the plug of the subject solid comprises reducing a flowable space through a pipe by increasing a thickness of the plug around an inner surface of the pipe.

17. The method of claim 11, wherein growing the plug of the subject solid to reduce the flow rate of the subject fluid comprises growing a plug of a salt material to reduce a flow rate of a molten salt material.

18. The method of claim 11, further comprising maintaining an operating temperature of the subject fluid, as measured in degrees Celsius, at less than or equal to about 25% higher than a freezing temperature of the subject fluid when the subject fluid is proximate to an inlet to the valve.

19. The method of claim 11, further comprising regulating a flow of a coolant to a portion of the heat exchange element distal from the plug.

20. The method of claim 19, wherein regulating the flow of the coolant to the portion of the heat exchange element comprises regulating the flow of air, argon, or helium to the portion of the heat exchange element.

* * * * *